M. W. TEBYRICA.
SURVEYING APPARATUS.
APPLICATION FILED FEB. 5, 1910.
969,732.
Patented Sept. 6, 1910.
3 SHEETS—SHEET 1.
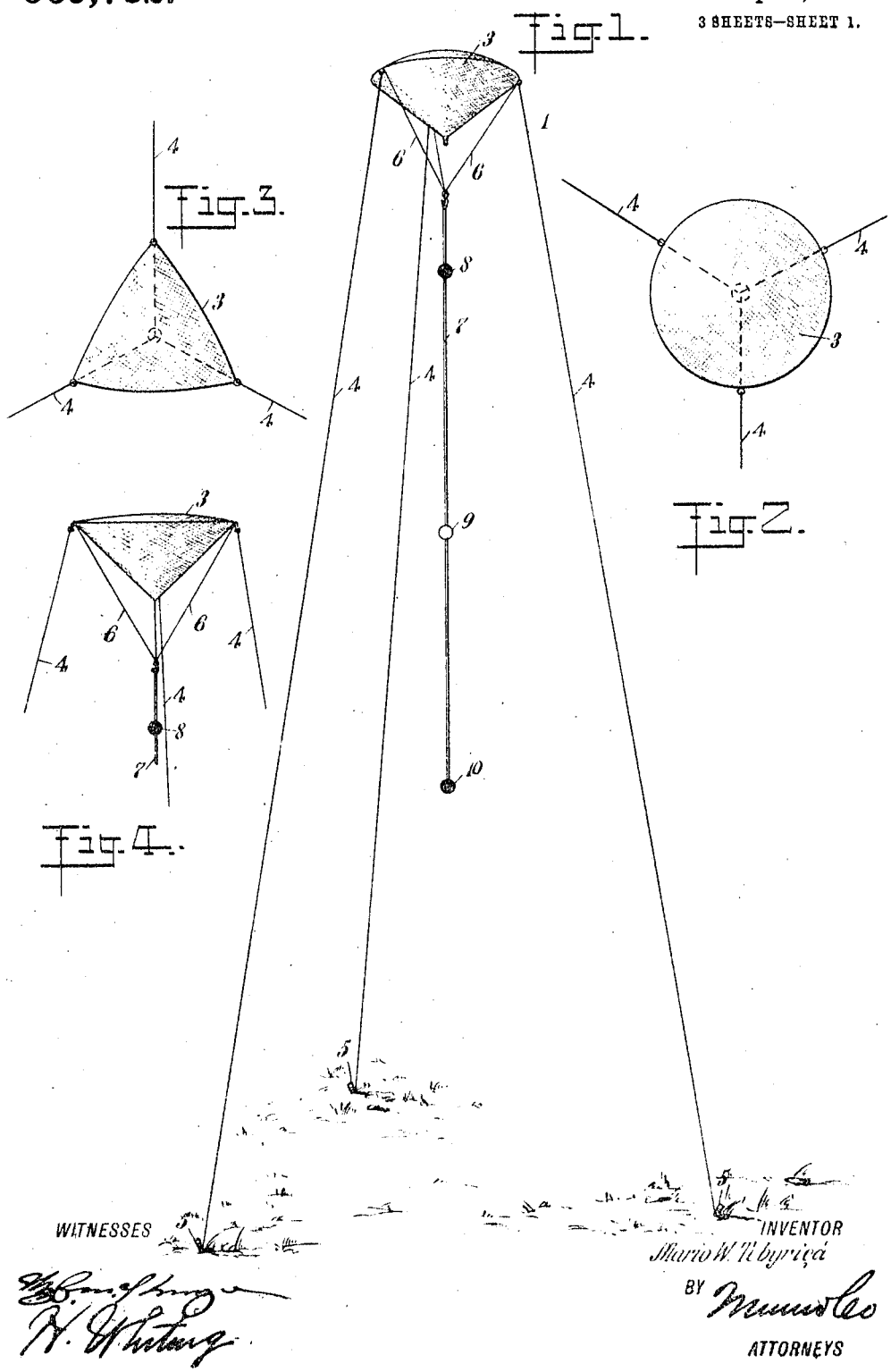

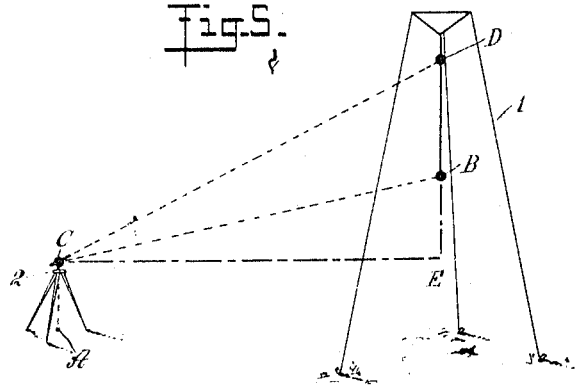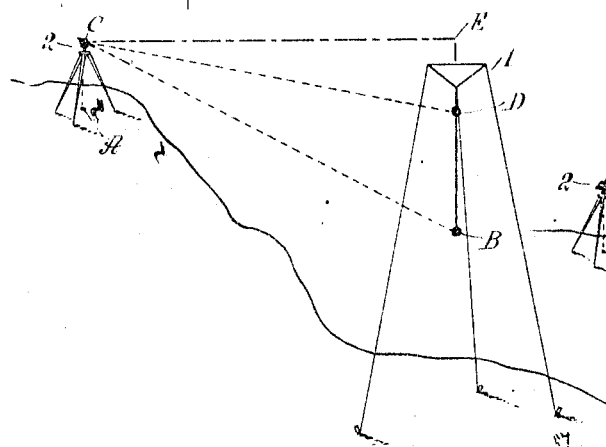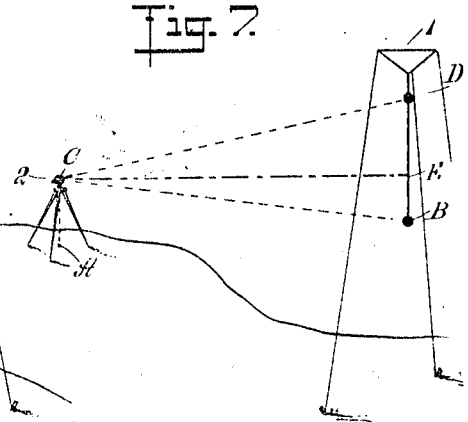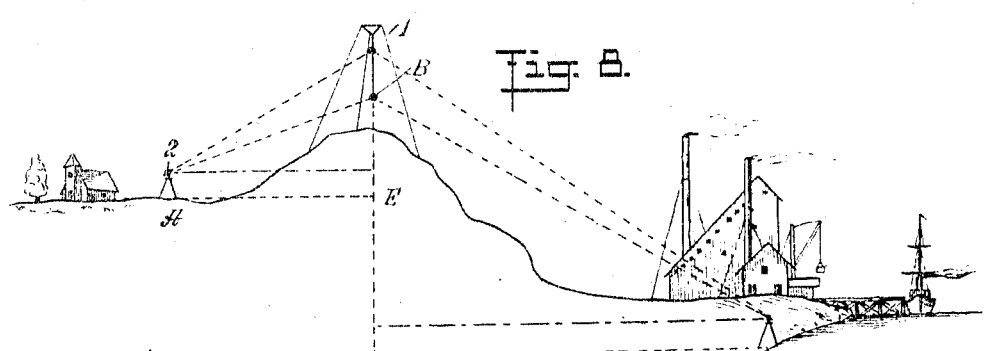

M. W. TEBYRIÇA.
SURVEYING APPARATUS.
APPLICATION FILED FEB. 5, 1910.
969,732.
Patented Sept. 6, 1910.
3 SHEETS—SHEET 3.
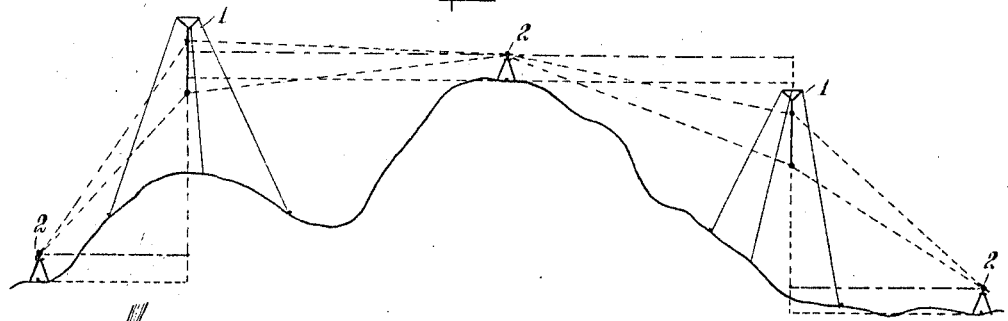
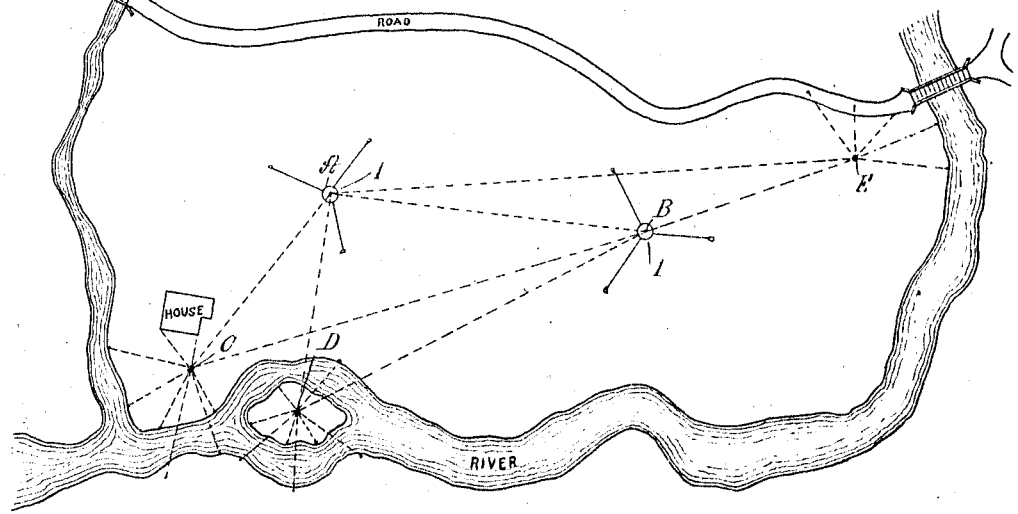
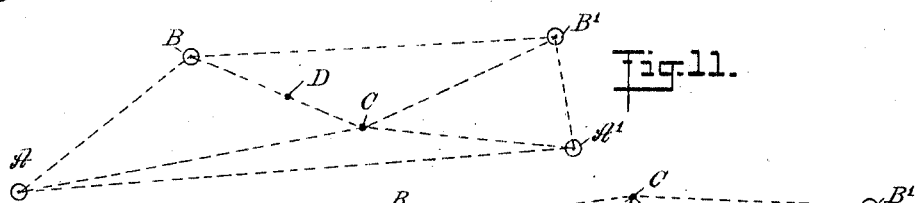
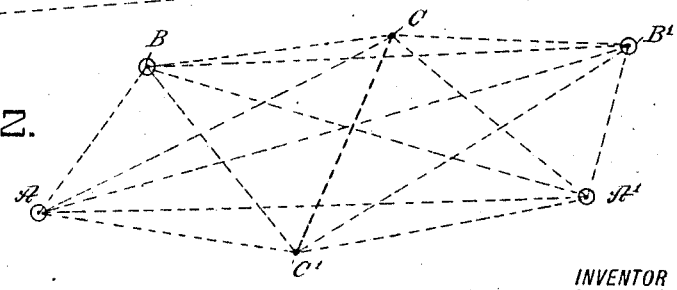
WITNESSES:
INVENTOR
Mario W. Tebyriçá
BY
ATTORNEYS

UNITED STATES PATENT OFFICE.

MARIO W. TEBYRIÇÁ, OF SÃO PAULO, BRAZIL, ASSIGNOR OF ONE-HALF TO JOSE P. TEBYRICA, OF SÃO PAULO, BRAZIL.

SURVEYING APPARATUS.

969,732.   Specification of Letters Patent.   Patented Sept. 6, 1910.

Application filed February 5, 1910. Serial No. 542,212.

*To all whom it may concern:*

Be it known that I, MARIO W. TEBYRIÇÁ, a citizen of the Republic of Brazil, and a resident of São Paulo, Brazil, have invented a new and Improved Surveying Apparatus, of which the following is a full, clear, and exact description.

This invention relates to a new and improved method of surveying, to determine the altitude, distance between points and area of surfaces, etc., and the apparatus for carrying out this method.

An object of this invention is to provide a new method of surveying, whereby various surveying operations may be performed by reference to two or more sight points vertically spaced at convenient distances and suspended from aerial apparatus in connection with suitable instruments capable of measuring horizontal and vertical angles.

A further object of this invention is to provide a suspended sight device, designated as a "ballometer," which will be simple in construction, strong, durable, which will expose the minimum amount of surface to the wind, and which will have the maximum amount of stability.

These and further objects of the method and the apparatus for carrying out the same, will be more fully described hereinafter and particularly set forth in the claims.

Reference is to be had to the accompanying drawings forming a part of this specification, in which similar characters of reference indicate corresponding parts in all the views, and in which—

Figure 1 is a perspective view illustrating one of the devices, which may be termed "ballometers," which are used for providing sight points; Fig. 2 is a top plan view of the same; Fig. 3 is a top plan view of another form of ballometer; Fig. 4 is a perspective view of the form illustrated in Fig. 3; Fig. 5 illustrates a simple method of determining the altitude of a given point with reference to the lower sight point on a ballometer, which has been termed "reference point," as will be seen hereinafter; also the horizontal distance between the two points, and particularly where the given point lies below the reference point. Fig. 6 represents the method of obtaining the altitude of a given point, in relation to the reference point on a ballometer, as well as the horizontal distance between said points, when the given point lies above the reference point. Fig. 7 illustrates the method of determining the altitude and the horizontal distance of a given point with respect to a reference point on the ballometer, when the horizontal line of sight through the center of the instrument lies between the reference point and the other sight point; Fig. 8 represents the method of determining the difference in altitude between two points when a single ballometer can be seen from both points. Fig. 9 illustrates the method of determining the difference in altitude between two points, when the topography of a country is such that a single ballometer cannot be seen from both points; Fig. 10 illustrates the method of determining the position of all points within reach, by use of ballometers; Fig. 11 illustrates graphically the simple method of tying the positions to a plurality of ballometers; and Fig. 12 illustrates another method of tying the positions of a plurality of ballometers.

Referring more particularly to the specific illustration of the invention, 1 indicates one or more ballometers of a form to be described, with which are used one or more suitable surveying instruments 2, such as theodolites, tachometers, or the like. The ballometers 1 consist of a balloon 3, of such a nature that it will float by its buoyancy in the air. This balloon 3 may be of any suitable form, but is preferably of such a form that it will offer the least resistance to the wind, and will tend to always remain in the same position on its vertical axis. Two forms of balloons are shown in Figs. 1 to 4. The one disclosed in Figs. 1 and 2 illustrates a conical-shaped balloon with the apex of the balloon extending downwardly, and Figs. 3 and 4 illustrate a balloon in the form of a triangular pyramid, with the apex of the pyramid extending downwardly. In any case, the balloon is held in a predetermined position by means of one or more guy lines 4, secured, in the case of the conical balloon, to the outer periphery of the base, and in the case of the pyramidal balloon, to the corners of the base. The number of guy lines 4 is preferably three, so that the point where they join the balloon will determine a plane which will preferably extend in a horizontal plane and coincide with the plane of the base of the balloon. The guy lines 4 are secured in any well known manner to the ground, as by means of stakes 5. Because of the position and form of the balloon, any wind will tend to pull the balloon upwardly against its guy lines, instead of deflecting it off to one side.

Suspended from the balloon 3, by one or more suspension members 6, there is provided a sight member 7, which may be in the form of a cord, wire, chain, rod, or the like. The sight member 7 is suspended preferably by three suspension cords 6, so that it may be accurately located in a vertical line. The sight member 7 is provided with a plurality of sight points 8, 9 and 10, the lower one of which is preferably made somewhat heavy, so as to give the necessary steadiness to the sight member. These sight points are preferably spherical in form, and may be of different colors, such as black and white, and may also be in the nature of illuminated sights, so that the surveying may be carried on by night if desired. The purpose of making the sight points spherical is so that when a sight is taken from any point, the sight planes passing through the cross-wires of the instrument and bisecting the spheres will invariably pass through their centers.

These ballometers are distributed at their various points at predetermined positions, according to the surveying operations to be carried out. This system of surveying, which may be designated as ballometry, will be described hereinafter and illustrated by various examples.

Ballometry requires the use of one or more ballometers and any convenient number of theodolites, tachometers, or other instruments designated for measuring horizontal and vertical angles. It is necessary that the telescope in the instrument should have a level connected thereto.

In a ballometric survey, whether or not accuracy is desired, it is not absolutely necessary to have more than two sight points. In the examples described hereinafter, the hanging rod will therefore be provided with but two sight points.

Ballometry may be defined as the method of determining the positions of the principal or working points of a survey with reference to two or more points fixed in the space, the relative positions of which are known. These points may be caled reference points. The purpose of the ballometers is to fix in the air the previously mentioned reference points, and inasmuch as it is immaterial whether the upper or lower sight points of the ballometer itself be chosen for its reference point, for the purpose of simplifying the description, I will designate the lower sight point as the ballometer's reference point. It is preferable that the distance between the sight points on each ballometer used in a surveying operation be exactly the same, for the purpose of simplifying the calculation. Specific examples of the ballometric method of surveying will now be described.

Referring more particularly to Fig. 5, there is there illustrated a method of determining the altitude of a given point by comparison with a reference point on a ballometer, and also determining the horizontal distance of said given point from said reference point where the given point lies below the reference point. Referring more particularly to the separate parts of the figure, A represents the given point; B the reference point; C the center of the instrument, and D the upper sight point. By taking sights on the points B, D, and with the telescope in a level position along the line C E, the angles D C B, B C E and D C E may be determined. Inasmuch as the distance D B is already known, the distance C E and the distance B E can be readily determined by a simple geometrical or trigonometrical calculation. The distance B E having been computed, the altitude of A can be readily determined with reference to B.

Fig. 6 illustrates the solution of the problem when the given point lies above the upper sight point on the ballometer. The solution is exactly similar to that of Fig. 5, the points being merely inverted.

Fig. 7 illustrates the sights taken in determining the altitude of a given point with respect to the reference point on the ballometer and its distance from the same, when the given point lies between the two sight points on the ballometer. As in the other figures, A represents the given point; C the center of the instrument; B the reference point, and D the other sight point on the ballometer, and E the point where the horizontal line of sight from the center of the instrument intersects the center line of the sight member. The distances C E and B E representing the horizontal distance of the instrument with the reference point and the difference in altitude of the instrument and the reference point, can again be readily determined by a simple geometrical or trigonometrical calculation after the angles D C E, D C B, and B C E have been determined by taking sights through the surveying instrument.

In Fig. 8, the method of determining the difference in altitude, and their distance apart, of two points separated by the contour of the land, so as to be invisible from each other, is illustrated. The differences in altitude B E and B E' of the given points A and A' with respect to the reference point B, can be determined as explained in Fig. 5. The difference of these two distances; that is, E E', will then represent the difference in altitude between the given points A and A'.

Fig. 9 illustrates the method of determining the difference in altitude between two given points, by the use of a plurality of ballometers and a plurality of instruments, when the contour of the land is such that a single ballometer could not be used.

In Fig. 10, a general surveying problem is illustrated. The ballometers, two of which are shown, are set up in convenient positions, designated by the letters A and B. The instrument, which is preferably a tachometer, is set up at a convenient point C, and the various horizontal distances C A and C B determined in the manner described in Figs. 5 to 7. The horizontal angle A C B may then be determined by sighting at the respective hanging rods of the ballometers A and B. This will enable the surveyor to compute the side A B of the triangle C A B, thus fixing the horizonal distance between the two ballometers. From the point C, the surveyor can then determine by irradiation the positions of all the points within the reach of the tachometer, the angles being read with reference to either of the lines C A or C B. In like manner, the surveyor can select other working points, as D, E, etc., from which the minor details may be determined by the tachometer.

In plotting the field work, the working points are fixed on the paper by intersections of arcs corresponding to the horizontal distances from the same to the ballometers. To check the ballometric field operation, all the triangles C A B, D A B, E A B, etc., having the common side A B, should be solved in order to find out whether any error has been made. Each individual solution of the separate triangles, with a view to compute the common side A B should give practically the same result, unless an error of some kind has been made. This method of checking field work enables the immediate detection of an error at the point at which it has occurred, and such an error will not influence the rest of the work.

In the case of geodetic or high surveying, ballometry does away with the expensive method of triangulation. In this case, the positions of the ballometers may be advanced as the survey progresses.

Fig. 11 represents a simple method of tying the ballometers together when it is required to remove the ballometers from the position indicated in A, B to the positions A′, B′. The instrument is first set at a point C, from which the four positions of the ballometers can be seen. The surveyor will then determine the position of the instrument with reference to the points A and B after the manner described in connection with Fig. 10, with the aid of a sight point D located in the ground in the direction of either of the ballometers A or B. The ballometers can then be removed to any convenient positions, such as A′ and B′. After the point C has been determined with reference to the new positions A′ and B′ of the ballometers, the angle D C B′ may be read, thus completing the necessary elements with which to tie the four positions of the ballometers.

Another method of tying the positions of the ballometers is illustrated in Fig. 12. Here the initial positions of the ballometers are indicated by the letters A and B, and their subsequent position, by the letters A′ and B′.

It will be readily seen by taking two separate instrument points C and C′, and taking sights from these points as indicated by the lines radiating therefrom to the ballometric positions A, B, A′ and B′, the points A and B can be tied to the points A′ and B′ by the lines A A′, A B′, B A′ and B B′, which may be readily calculated in the manner described in connection with the previous figures by simple geometrical or trigonometrical computations.

While I have shown the hanging rod or sight member suspended from a balloon, it may be applied to any other aerial apparatus, or held in the air by any other means, such as tall chimneys, buildings, or the like.

While several concrete examples of use of the ballometer in surveying have been shown, I do not wish to limit myself to the exact method of carrying out these operations, but desire to cover the method of surveying as broadly as possible within the scope of the appended claims.

Having thus described my invention, I claim as new and desire to secure by Letters Patent:—

1. In a device of the class described, the combination with a buoyant supporting member, of a sight member suspended from said supporting member.

2. In a device of the class described, the combination with a buoyant supporting member, of means for securing said supporting member, and a sight member connected to said supporting member.

3. In a device of the class described, the combination with an aerial support, of means for constraining said support, and a sight member connected to said aerial support.

4. In a device of the class described, the combination with an aerial support, of a sight member connected to said support, and one or more sight points on said sight member.

5. In a device of the class described, the combination with an aerial support, of a sight member connected to said support, and one or more spherical sight points connected to said sight member.

6. In a device of the class described, the combination with a support, of a sight member suspended from said support, and a plurality of sight points on said sight member, one of said sight points being relatively heavy, to impart steadiness to said sight member.

7. In a device of the class described, the combination with an aerial support, of means for tying said aerial support at one or more points to the ground, and a sight member connected to said aerial support at one or more points.

8. In a device of the class described, the combination with a balloon adapted to float in the air, of means for securing said balloon in a predetermined position, and a sight member suspended from said balloon and having one or more sight points thereon.

9. In a device of the class described, the combination with a balloon having a downwardly converging taper, of means for securing said balloon, and a sight member connected to said balloon.

10. In a device of the class described, the combination with an aerial support, of a three-point securing means for said support, and a sight member connected to said support.

11. In a device of the class described, the combination with an aerial support, of means for securing said support, a sight member, and a three-point connection between said aerial support and said sight member.

12. In a device of the class described, the combination with an aerial support, of a three-point securing means for said support, a sight member, and a three-point connection means between said sight member and said support.

In testimony whereof I have signed my name to this specification in the presence of two subscribing witnesses.

MARIO W. TEBYRIÇA.

Witnesses:
D. MULQUEEN,
F. A. NYSTON.